(12) United States Patent
Lühmann et al.

(10) Patent No.: US 6,395,389 B1
(45) Date of Patent: May 28, 2002

(54) ADHESIVE TAPE STRIP

(75) Inventors: Bernd Lühmann, Norderstedt;
Thorsten Krawinkel, Hamburg, both of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/392,432

(22) Filed: Sep. 9, 1999

(30) Foreign Application Priority Data

Sep. 19, 1998 (DE) .......................................... 198 42 864

(51) Int. Cl.[7] .................................................. C09J 7/02
(52) U.S. Cl. ...................... 428/343; 428/40.1; 428/354; 428/317.3; 428/355 BL; 248/205.3; 206/411
(58) Field of Search ................................ 428/343, 40.1, 428/42.1, 354, 355 BL, 317.3; 248/205.3, 301, 304; 206/411

(56) References Cited

U.S. PATENT DOCUMENTS

| 5,409,189 A | 4/1995 | Luhmann |
| 5,491,012 A | 2/1996 | Luhmann et al. |
| 5,626,931 A | 5/1997 | Luhmann |
| 5,897,949 A | * 4/1999 | Lühmann et al. ........ 428/317.3 |
| 5,984,247 A | * 11/1999 | Lühmann et al. ........ 248/205.3 |
| 6,004,665 A | * 12/1999 | Lühmann et al. ........ 428/317.3 |
| 6,136,397 A | * 10/2000 | Lühmann et al. .......... 428/40.1 |

FOREIGN PATENT DOCUMENTS

| DE | 42 22 849 C1 | 7/1992 |
| DE | 42 33 872 A1 | 3/1994 |
| DE | 44 28 587 A1 | 2/1996 |
| EP | 0 845 515 A2 | 6/1998 |

OTHER PUBLICATIONS

Derwent Abstract of EP 845515.

* cited by examiner

*Primary Examiner*—Daniel Zirker
(74) *Attorney, Agent, or Firm*—Norris McLaughlin & Marcus

(57) ABSTRACT

Adhesive tape strip for a rereleasable adhesive bond, which can be removed from a bonded joint by pulling in the direction of the bond plane, having a nonadhesive grip tab and a subsequent, elongate strip which is adhesive on one or both sides, characterized in that the strip has a width of 2–6 mm and a ratio of width to thickness of less than or equal to 10:1.

16 Claims, No Drawings

ADHESIVE TAPE STRIP

The invention relates to an adhesive tape strip for a rereleasable adhesive bond which can be removed from a bonded joint by pulling in the direction of the bond plane.

A common use of transparent self-adhesive films is the temporary fixing of very light, usually flat articles, such as very small pictures, postcards, posters, drawings, decorations, etc., in the home and office sector. In this application, self-adhesive films are often employed as an alternative to hooks, thumb tacks and pins. Advantages of self-adhesive tapes over the latter fastening means include their handling safety (no risk of injury), their extensive invisibility (through the high transparency of the self-adhesive films), the possibility of fixing even to solid surfaces through which pins cannot or should not pass, and the possibility of being able to detach an adhesive bond after it has been produced, from sufficiently firm substrates, nondestructively and without residue, by peeling off the adhesive film. A disadvantage is that the adhesive films are often impossible to redetach from unfirm substrates, such as wallpapers, paper, board, painted walls, etc., without destroying the substrate. Adhesive films of this kind are on the market as tesa-film® or Scotch tape®.

Elastically or plastically highly extensible self-adhesive tapes which can be redetached nondestructively and without residue by stretching essentially in the bond plane (by what is known as stripping), even from in some cases highly sensitive bonding substrates, such as papers or coated woodchip wallpaper, for example, are described in U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729 and DE 197 08 366. They are frequently employed in the form of adhesive tape strips having a preferably nonadhesive griptab region from which the detachment process is initiated particular applications and embodiments of such self-adhesive tapes can be found, inter alia, in DE 42 33 872, WO 94/21157, DE 44 28 587, DE 44 31 914, WO 97/07172, DE 196 49 636 and WO 98/03601. The products described in the abovementioned patents, however, are all designed for the adhesive bonding of moderately heavy to heavy articles, and so must have high bond strengths. A very large proportion of the fixing operations desired in the home and office sector, however, relate as described above to small and very small articles, such as, for instance, the fastening of very small pictures, postcards, photos, drawings, and articles typically attached to notice boards, for the fastening of which it has conventionally been sufficient, in many cases, to use simple self-adhesive films, pins, hooks and thumb tacks. For the abovementioned applications, the self-adhesive tapes which have been on the market to date and are described in the abovementioned patents, and which are redetachable by stretching in the bond plane, are therefore relatively unsuitable, as a result, inter alia, of their inconvenient handling and of the very high costs per application, which is a considerable barrier to their mass application. Thus it is found in practice that advantageous adhesive tapes, especially for fixing small articles, are those which have very low stripping forces in order to permit easy and simple detachment—including detachment by the hands of children, for example—and which are, in addition, adapted in shape and size to the articles to be bonded.

The object of the present invention was therefore to provide adhesive tape strips which are suitable for the adhesive bonding of small articles and at the same time are in particular configured such that, in the course of the detachment process, they have no tendency to tear and at the same time also facilitate the stripping operation, especially for individuals who are not so strong, such as women, children and the elderly.

One possibility for obtaining more readily strippable (lower stripping forces) and also less expensive self-adhesive tapes and adhesive tape strips is to reduce their thickness. As indicated in DE 33 31 016 C2 (p. 2, line 50 et seq.), the thickness of the adhesive tape strips described therein is of critical importance to the detachment process (detachment by stretching in the bond plane). The peel force required for detachment is composed of the force required for peeling the adhesive tape from the bond substrate and the force which must be expended in order to deform the adhesive tape. The latter force is approximately proportional to the thickness of the adhesive tape; the former force can for simplicity, within the thickness range under consideration, be assumed to be constant. The tensile strength of such an adhesive tape, on the other hand, increases in direct proportion to its thickness. It follows from this that for self-adhesive tapes in accordance with DE 33 31 016 C2 the tensile strength becomes smaller, below a certain thickness, than the peel force, with the consequence that correspondingly thin products can no longer be released from the substrates by stretching in the bond plane but instead tear when an attempt is made to release them in this way. The problem described in DE 33 31 016 C2 can be transferred, mutatis mutandis, to strippable self-adhesive tapes with other product constructions, an example being multi-layer systems.

A second possibility for obtaining less expensive self-adhesive tapes or self-adhesive tape strips with simultaneously low stripping forces by simple size variation consists in selectively reducing the adhesive tape width. With adhesive tapes of very low width it is observed, surprisingly, that tearing or substrate damage during the detachment process, events which occur readily, for example, at the end of the detachment process (i.e., when detaching the last few mm of the respective adhesive tape strip) are absent, or present only to a significantly reduced extent, in practical use in comparison to the analogous but wider adhesive tape strips. This is so in particular even when the adhesive strips used are not shaped in accordance with DE 44 28 587. The abovementioned property is particularly advantageous when the intention is to utilize adhesive tapes having very soft and hence usually very pressure-sensitively adhesive (very tacky) adhesive compositions and/or self-adhesive tapes whose stretchability is low, since in both cases experience has shown that there is a particularly pronounced tendency towards sharp increases in stripping force at the end of the detachment process. Adhesive tape strips which possess high pressure-sensitive adhesion offer the advantage that high bond strengths can be realized even with low application pressures. Because of the very great lengths by which a strip must be extended for the detachment process, high strip elongations are often perceived as disadvantageous in practice. In addition, in the extended state, the adhesive strip to be detached can easily stick to one of the substrate surfaces, if, as a consequence of its great length in the stretched state, the adhesive strip is unable to be detached continuously in one piece, and so the detachment process is interrupted. However, adhesive strips bonded under stress in this way tear with particular ease when the attempt is made, finally, to remove them from the bonded joint.

One cause of the markedly lower tendency towards instances of tearing and substrate damage when using the adhesive tapes of the invention (very narrow adhesive tape strips) in fact appears to be that, as a consequence of the resultant very low stripping forces, the separation rates employed by the user are significantly higher in comparison to their previous (wider) counterparts. The more rapid removal of the adhesive tape strips from the bonded joint by the user in comparison to the analogous but wider adhesive tape strips consistently results in the greater stretching of such strips during the detachment process. This brings about a greater reduction in the pressure-sensitive adhesion of the adhesive strips on removal from the bonded joint, which in accordance with DE 33 31 016 C2, line 25, is an essential prerequisite for a tear-free detachment process over the entire length of the adhesive tape to be detached. The reduced tearing tendency in the end region of narrow strippable adhesive tape strips of the invention is all the more surprising, since at the relatively high separation rates which occur in practice, the ratio of tensile strength to stripping force (the so-called safety factor against tearing) becomes markedly smaller as a result,of the stripping force, which increases in tandem with the rate of detachment (within the detachment range under consideration, the ultimate tensile strengths are approximately constant).

A further possible explanation for the significantly lower number of tears in the case of very narrow adhesive strips is that physical effects which take effect in the course of stripping in the two marginal regions of the adhesive strips become dominant, or in any case gain in importance, relative to those in the middle region of the adhesive strips. Thus, when an adhesive strip is detached (in the course of stripping) from the bond substrates, there is a distinct reduction in the width and thickness of the adhesive strip, which in the case, for example, of adhesive tapes in accordance with DE 33 31 016 or DE 197 08 366, can be described via their rubber-elastic behaviour. In accordance with the rubber-elastic nature of the abovementioned adhesive strips, the detachment forces which occur bring about deformations of the adhesive strips in the region in which these strips detach from the substrates and also, likewise, in the adjacent region which is still bonded. In both regions, deformations will have markedly different effects in the marginal zones of the adhesive strips than in the middle region of the adhesive strips, and this can have a significant influence over the tendency to tear during the detachment process.

Self-adhesive tape strips of the invention can be of single- or multi-layer construction. Suitable in principle are single-layer adhesive tapes in accordance with DE 33 31 016 and DE 42 22 849 or multi-layer adhesive tapes consisting of one or more layers of adhesive and of one or more film- or foam-comprising layers in accordance with U.S. Pat. No. 4,024,312, DE 195 31 696, DE 196 26 870, DE 197 08 366, DE 196 49 727, DE 196 49 728, DE 196 49 729 or else those in accordance with WO 92/11332, WO 92/11333 and WO 95/06691. Intermediate foam carriers may advantageously be part of adhesive tape strips of the invention when, inter alia, the intention is to use, for example, those having a relatively high flexural rigidity. In accordance with the invention it is possible to employ both single-sided and double-sided adhesive tape strips.

Rectangular adhesive tape strips of the invention are preferably between about 2 mm and about 6 mm, with particular preference between 2.5 mm and 4.5 mm, in width. The stated lower limits are set primarily by the practical handling of such adhesive strips by the user. Adhesive strips have a width to thickness ratio of $\leq 10:1$, preferably $\leq 7:1$ and, with particular preference, $\leq 5:1$, in particular down to a lower limit of 1:1. Typical adhesive strip lengths are between about 20 mm and 100 mm, preferably between about 25 mm and 50 mm. Adhesive strips can be shaped in the end region optionally as in DE 44 28 587, e.g. they can run to a point. Adhesive tape strips have typical thicknesses of between about 300 $\mu$m and about 2500 $\mu$m, preferably between 400 $\mu$m and 1500 $\mu$m and, with particular preference, between 500 $\mu$m and 1200 $\mu$m. Where the adhesive tape strips include one or more foam-comprising layers, typical thicknesses of adhesive film strips are from about 300 $\mu$m to about 5000 $\mu$m, preferably from about 400 $\mu$m to 3000 $\mu$m, and with particular preference, from 500 $\mu$m to 2000 $\mu$m.

Typical applications of the adhesive tape strips of the invention are the fixing of small and light articles, such as small pictures, postcards, posters, decorations, etc., in the home and office sector. Such adhesive strips are particularly suitable for the fixing of articles which are typically fastened to notice boards. In one specific embodiment, the nonadhesive grip-tab regions of such adhesive strips are produced by coloured printing or coating with coloured films, foils or papers. An advantage in this case is that, as a result of the coloured design of the grip-tab regions, the grip tabs themselves remain readily visible. A further advantage is the more attractive appearance of such adhesive strips. Particular preference is given to imprints or coatings by means of coloured films, foils or papers which utilize dyes based on fluorescent pigments, i.e. fluorescent inks.

Typical presentation forms include, punched adhesive tape strip sections covered on one side with a release laminate (typically release paper or release film) which are present with their second pressure-sensitive adhesive side, approximately in the manner of pressure-sensitive adhesive labels, on release paper roll stock or release film roll stock and can be removed, for example, from a carton pack having a slot and optionally a tear-off means, or else those which are present on release paper sheet stock or release film stock. A preferred pack form is that of a booklet which contains a plurality of sheets of release paper or release film which bear adhesive strips of the invention. Further possibilities include, inter alia, cartons or cans containing adhesive tape strips covered on both sides with a release paper or a release film. The abovementioned descriptions should be understood as selected examples from a host of possible presentation forms.

EXAMPLES

Example I 40 parts of a polyisoprene-modified styrene-ethylene/butylene-styrene block copolymer (Kraton G RP 6919; Shell), 10 parts of a styrene-ethylene/butylene-styrene block copolymer (Kraton G 1650; Shell), 50 parts of a hydrogenated hydrocarbon resin (Regalite R 101; Hercules) and 1 part of primary antioxidant (Irganox 1010; Ciba) are processed to a homogeneous mixture at a temperature of +180° C. in a kneading apparatus with a sigma blade. After cooling, the adhesive composition is extruded at +200° C. to produce single-layer adhesive tape sections with a thickness of 800±60 $\mu$m.

From the adhesive film sections, a punch is used to obtain rectangular adhesive strips having the dimensions 40 mm×50 mm and 20 mm×50 mm, 10 mm×50 mm, 5 mm×50 mm and 3.5 mm×50 mm (in each case width×length) which are covered at one end on both sides with a grip tab consisting of 12 mm long and 25 $\mu$m thick polyester films (Hostaphan RN 25) matched to the width of the adhesive strips. Some of the adhesive tape sections measuring 5 mm×50 mm (width×length) are shaped to a point at the end by cutting out a right-angled triangular section with an edge length (of the two catheti) of 5 mm. Using one adhesive strip in each case, a pair of rectangular glass plates measuring 100 mm×50 mm are bonded centrally on one of their short sides, congruently, in such a way that the nonadhesive grip-tab region projects about 10 mm from the bonded joint. The adhesive strips are subsequently removed manually by various persons from the bonded joint by stretching in the bond plane. It is found here that narrower adhesive strips are removed much more quickly from the bonded joint by the persons carrying out the test. Ten tests were conducted per adhesive strip. Stripping forces were measured by means of a spring balance. The results obtained are as follows:

| Test | Adhesive strip width//w/t* | Adhesive strip end | Number of tears | Detachment rate; subjective |
|------|---------------------------|-------------------|-----------------|----------------------------|
| 1-01 | 40 mm//50 | straight | 7 out of 10 | low |
| 1-02 | 20 mm//25 | straight | 4 out of 10 | moderate |
| 1-03 | 10 mm//12.5 | straight | 1 out of 10 | moderate/quick |
| 1-04 | 5 mm//6.25 | straight | no tears | quick |
| 1-04a | 5 mm//6.25 | tapered | no tears | quick |
| 1-05 | 3 mm//3.75 | straight | no tears | quick |

*w/t = ratio of width to thickness of the adhesive strips

| Test | Ultimate tensile strength | Stripping force | Safety factor |
|------|--------------------------|-----------------|---------------|
| 1-01 | 275 N/strip | 35 N/strip | 7.9 |
| 1-02 | 145 N/strip | 19 N/strip | 7.6 |
| 1-03 | 75 N/strip | 11 N/strip | 6.7 |
| 1-04 | 40 N/strip | 6.5 N/strip | 6.1 |
| 1-04a | 40 N/strip | 6.5 N/strip | 6.1 |
| 1-05 | 25 N/strip | not determined | — |

Despite higher detachment rate and thus lower ratio of ultimate tensile strength to detachment force (stripping force), and resultant lower safety factor against tears, a significant reduction in the number of tears during the detachment process is observed in the practical application of the adhesive tape strips. Samples from test 1-04a show particularly easy and hence pleasing detachment in the tapering region at the end of the stripping process. Even at extremely low detachment rates, no tears whatsoever in the end region of the pressure-sensitive adhesive strips occur in the case of the samples in accordance with test 1-04a.

Example II

In the case of adhesive strips in accordance with test 1-04 (but with a total length of 35 mm) the polyester film grip tabs are replaced by circular coloured paper grip tabs with a diameter of 6 mm. Adhesive strips of this kind are particularly suitable for bonding small and very light flat articles, on notice boards, for example. Owing to the colour design of the grip-tab regions it is possible to recognize their position very rapidly and hence to find them again easily. Particularly suitable for rapid recognition in the present case are grip-tab papers which are printed using fluorescent inks.

Example III

In accordance with Ex. I, 800 μm thick rectangular adhesive tape sections of different widths, which possess a two-layer product construction, are investigated. Layer 1 consists of an approximately 400 μm thick pressure-sensitive adhesive composition based on 50 parts of Vector 4113 (styrene-isoprene-styrene triblock copolymer with a styrene-isoprene diblock content of about 15%, from Dexco), 50 parts of Foralyn 110 (penta ester of partially hydrogenated balsam rosin; Hercules) and 1 part of Irganox 1010 (phenolic antioxidant; Ciba). Layer 2 consists of a likewise approximately 400 μm thick layer based on 20 parts of Vector 8508 (styrene-butadiene-styrene triblock copolymer; Dexco), 30 parts of Vector 4211 (styrene-isoprene-styrene triblock copolymer; Dexco), 50 parts of Foralyn 110 and 1 part of Irganox 1010. The properties found are as follows:

| Test | Adhesive strip width//w/t* | Adhesive strip end | Number of tears | Detachment rate; subjective |
|------|---------------------------|-------------------|-----------------|----------------------------|
| 3-01 | 30 mm//37.5 | straight | 8 out of 10 | low |
| 3-02 | 3 mm//3.75 | straight | 0 out of 10 | rapid | w/t = ratio of width to thickness of the adhesive strips

What is claimed is:

1. An adhesive tape strip capable of being bonded to a substrate and subsequently released therefrom by pulling on the adhesive tape strip in the direction of the plane of the bond formed between said adhesive tape strip and said substrate, said adhesive tape strip comprising adhesive on one or both sides and at least one nonadhesive grip tab, wherein the adhesive tape strip has a width of 2 to 6 mm and a ratio of width to thickness of less than or equal to 10:1.

2. The adhesive tape strip according to claim 1, which has a thickness of from 300 to 5000 μm.

3. The adhesive tape strip according to claim 2, which has a thickness of from 400 to 3000 μm.

4. The adhesive tape strip according to claim 1, which has a width of 2.5 to 4.5 mm and a ratio of width to thickness of less than or equal to 7:1.

5. The adhesive tape strip according to claim 1, which has a width of 2.5 to 4.5 mm and a ratio of width to thickness of less than or equal to 5:1.

6. The adhesive tape strip according to claim 1, which comprises one or more foam-comprising layers.

7. The adhesive tape strip according to claim 1, wherein the grip tab comprises a colored design.

8. The adhesive tape strip according to claim 1, which has a bond area which deceases towards an end of the adhesive tape strip.

9. The adhesive tape strip according to claim 8, which has a bond area which decreases towards an end of the adhesive tape strip because the end is a jagged point or convexly curved, because the adhesive tape strip ends in a corrugated boundary, or because the surface of the adhesive tape strip is neutralized by means of a cover or of an imprint towards the end of the adhesive tape strip.

10. The adhesive tape strip according to claim 1, wherein the adhesive tape strip:
   a) is based on thermoplastic rubber and tackifying resins;
   b) is elastic;
   c) exhibits an adhesion less than its cohesion, wherein the adhesion weakens when the adhesive tape strip is extended;
   d) exhibits a ratio of peel force to tensile strength of at least 1:1.5; and
   e) is formulated to be self-adhesive or heat-activatable.

11. The adhesive tape strip according to claim 1, which comprises a cover over the grip tab.

12. The adhesive tape strip according to claim 11, wherein the cover is UV-impermeable.

13. The adhesive tape strip according to claim 9, wherein the cover comprises a dimensionally stable polymer film.

14. The adhesive tape strip according to claim 13, wherein the dimensionally stable polymer film is laminated onto both sides of the adhesive tape strip.

15. The adhesive tape strip according to claim 1, which comprises an extensible backing film and a self-adhesive composition on both sides of the backing film, wherein the backing film has an elongation at break (tensile strength at break) sufficiently high that the backing film does not tear before the adhesive tape strip can be released from the substrate.

16. A method comprising bonding an adhesive tape strip according to any one of claims 1–15 to a substrate and a thereafter releasing said adhesive tape strip from said substrate by gripping said grip tab and pulling on said grip tab in the direction of the plane of the bond formed between said adhesive tape strip and said substrate.

* * * * *